United States Patent
Takahashi et al.

(10) Patent No.: US 6,792,823 B2
(45) Date of Patent: Sep. 21, 2004

(54) GEAR DRIVE MECHANISM FOR OFFICE PRODUCTS

(75) Inventors: Toshihiro Takahashi, Nagoya (JP); Kiyoshi Sugimoto, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 61 days.

(21) Appl. No.: 09/813,863

(22) Filed: Mar. 22, 2001

(65) Prior Publication Data

US 2001/0026719 A1 Oct. 4, 2001

(30) Foreign Application Priority Data

Mar. 31, 2000 (JP) ........................................ 2000-101171

(51) Int. Cl.[7] .............................. B25G 3/00; F16H 1/40
(52) U.S. Cl. .............................. 74/431; 74/395; 74/413; 403/316
(58) Field of Search ........................ 74/395, 413, 414, 74/431, 650, 417; 384/903; 403/315, 316, 317, 318, 319, 326, 353, 359.5; 411/517; 399/117

(56) References Cited

U.S. PATENT DOCUMENTS

| | | | | |
|---|---|---|---|---|
| 2,026,454 A | * | 12/1935 | Benzing | .................... 411/517 |
| 2,834,620 A | * | 5/1958 | Maude | .................... 411/517 X |
| 2,886,355 A | * | 5/1959 | Wurzel | ...................... 403/326 |
| 3,340,760 A | * | 9/1967 | Wormser | ................ 411/517 X |
| 3,396,554 A | * | 8/1968 | Westercamp | .......... 403/317 X |
| 3,442,171 A | * | 5/1969 | Engelmann | ................ 411/517 |
| 3,469,494 A | * | 9/1969 | Frailly | ........................ 411/517 |
| 3,531,144 A | * | 9/1970 | Bizilia | ........................ 403/326 |
| 3,588,154 A | * | 6/1971 | Voight | ....................... 403/326 |
| 3,595,123 A | * | 7/1971 | Wurzel | ...................... 411/517 |
| 3,992,117 A | * | 11/1976 | Ristau | ......................... 403/315 |
| 4,124,318 A | * | 11/1978 | Sagady | ................ 403/359.5 X |
| 4,405,251 A | * | 9/1983 | Kolchinsky et al. | ..... 403/326 X |
| 4,470,735 A | * | 9/1984 | Salisbury | ................. 411/517 X |
| 4,630,506 A | * | 12/1986 | Allmandinger et al. | ... 74/606 R |
| 4,692,079 A | * | 9/1987 | Killian et al. | ........... 411/517 X |
| 5,094,117 A | * | 3/1992 | Mikel et al. | ................... 74/395 |
| 5,127,764 A | * | 7/1992 | Baer | ....................... 403/326 X |
| 5,131,894 A | * | 7/1992 | Hilker | ..................... 403/326 X |
| 5,536,101 A | * | 7/1996 | Schwarzler et al. | . 403/359.5 X |
| 5,620,388 A | * | 4/1997 | Schlegelmann et al. | ...................... 74/606 R X |
| 5,671,640 A | * | 9/1997 | Valente | ........................ 74/650 |
| 5,762,173 A | | 6/1998 | Nishimura | |
| 5,845,110 A | | 12/1998 | Lee | |
| 6,014,916 A | * | 1/2000 | Tyson | ........................... 74/650 |
| 6,070,945 A | * | 6/2000 | Ritchey et al. | ............. 299/107 |
| 6,116,809 A | * | 9/2000 | Raszkowski | ............... 74/438 X |
| 6,490,426 B1 | * | 12/2002 | Zaman | ........................ 399/117 |
| 6,557,947 B1 | * | 5/2003 | Hunt | ......................... 74/417 X |

FOREIGN PATENT DOCUMENTS

| | | |
|---|---|---|
| CH | 282 171 | 4/1952 |
| EP | 0 850 771 A2 | 7/1998 |
| JP | 06-058376 | 3/1994 |
| JP | 6-058737 | 3/1994 |
| JP | 09-242851 | 9/1997 |

OTHER PUBLICATIONS

JIS Standard, Retaining Rings—E Type, B 2805–1978.

* cited by examiner

*Primary Examiner*—David A. Bucci
*Assistant Examiner*—Colby Hansen
(74) *Attorney, Agent, or Firm*—Oliff & Berridge, PLC

(57) ABSTRACT

A gear drive mechanism for downsizing office products, which can be easily disassembled, by thinning the gear drive mechanism. The gear drive mechanism drives a plurality of shafts cantilevered from a base plate attached within a label writer, wherein gears are fit on the shafts, and are engaged with each other, with specific shafts used as drive shafts. The gear drive mechanism comprises a groove formed around an end of at least one of the driven shafts other than the specific shafts, a ring-shaped washer having a slit in a direction of a diameter fit in the groove as a gear removal preventive and a recessed portion provided to a side surface of the gear throughout the washer.

16 Claims, 7 Drawing Sheets

GEAR DRIVE MECHANISM FOR OFFICE PRODUCTS

BACKGROUND OF THE INVENTION

1. Field of Invention

The invention relates to a gear drive mechanism that drives a drive shaft in an office product. In particular, the gear drive mechanism is provided with a gear removal preventive (i.e. a lock) after a gear is fit to a cantilever-like shaft.

2. Description of Related Art

As a conventional office product, label writers have been used to print characters and the like on a label tape. A cassette in which the label tape is wound is installed in the label writer. The label writer feeds the label tape from the cassette to a printhead. A printhead prints characters and the like on the label tape and a platen roller discharges the printed label tape outside a main body using a nip roller. Such a series of driving in the label writer is performed by a gear drive mechanism provided in the main body of the label writer under the cassette.

The gear drive mechanism is structured such that a plurality of shafts, including a drive shaft, cantilevers from a base plate. Gears are fit into the respective shafts, with the gears engaged with each other such that the gears are prevented from coming off of the shafts. A general method for preventing the gears from coming off includes a groove formed around an end of the shaft with a removal preventive washer fit into the groove.

In the conventional drive mechanism, an E-shaped removal preventive clip, that is an elastic metal plate, is used for the removal preventive washer. The E-shaped removal preventive clip is shaped like the letter C having a protrusion at the center. The E-shaped removal preventive clip has an opening with respect to the shaft, so that the E-shaped removal preventive clip can be easily attached/detached to/from the shaft.

However, the size, thickness, material and shape of the E-shaped removal preventive clip are specified in the JIS Standard. Thus, the size variety of the E-shaped removal preventive clip is small. Therefore, in the conventional gear drive mechanism, the diameter and length of the shaft has been determined based on the specifications of the E-shaped removal preventive clip. Small office products, such as the label writer, requires that the gear drive mechanism to be slim and lightweight. However, in creating the slim and lightweight gear drive mechanism, the gear drive mechanism is limited to the specifications of the E-shaped removal preventive clip. If the specified E-shaped removal preventive clip is not used, it becomes possible to slim the gear drive mechanism and lower its weight. However, it is difficult to disassemble the gear drive mechanism.

SUMMARY OF THE INVENTION

The invention provides a gear drive mechanism that is easy to disassemble and contributes to the miniaturization of the office products by thinning the gear drive mechanism.

In various exemplary aspects of a gear drive mechanism that drives a specific shaft by which a plurality of shafts cantilever from a base plate, wherein gears are fit to the shafts and engaged with each other, the gear drive mechanism includes a groove formed around an end of at least one of the shafts other than the specific shaft, a washer having a ring-shape and a slit in a direction of a diameter fit in the groove as a gear removal preventive of the gear and a recessed portion provided in a part of a side surface of the gear throughout the washer.

According to the gear drive mechanism of this invention, the gear can be prevented from coming off by using the thin ring-shaped washer having a simple structure and the slit in the direction of diameter. Because the washer has the simple structure, a diameter and length of the shaft can be minimized using the washer conforming to the shaft. Further, the gear drive mechanism can be easily disassembled by which the slit in the washer is aligned with the recessed portion provided to the side surface of the gear, with a tool inserted in the recessed portion. Furthermore, the gear drive mechanism can be thin, so that the office products can be downsized.

BRIEF DESCRIPTION OF THE DRAWINGS

Preferred embodiments of the invention will be described in detail with reference to the following figures wherein.

DETAILED DESCRIPTION OF PREFERRED EMBODIMENTS

Figure 1:
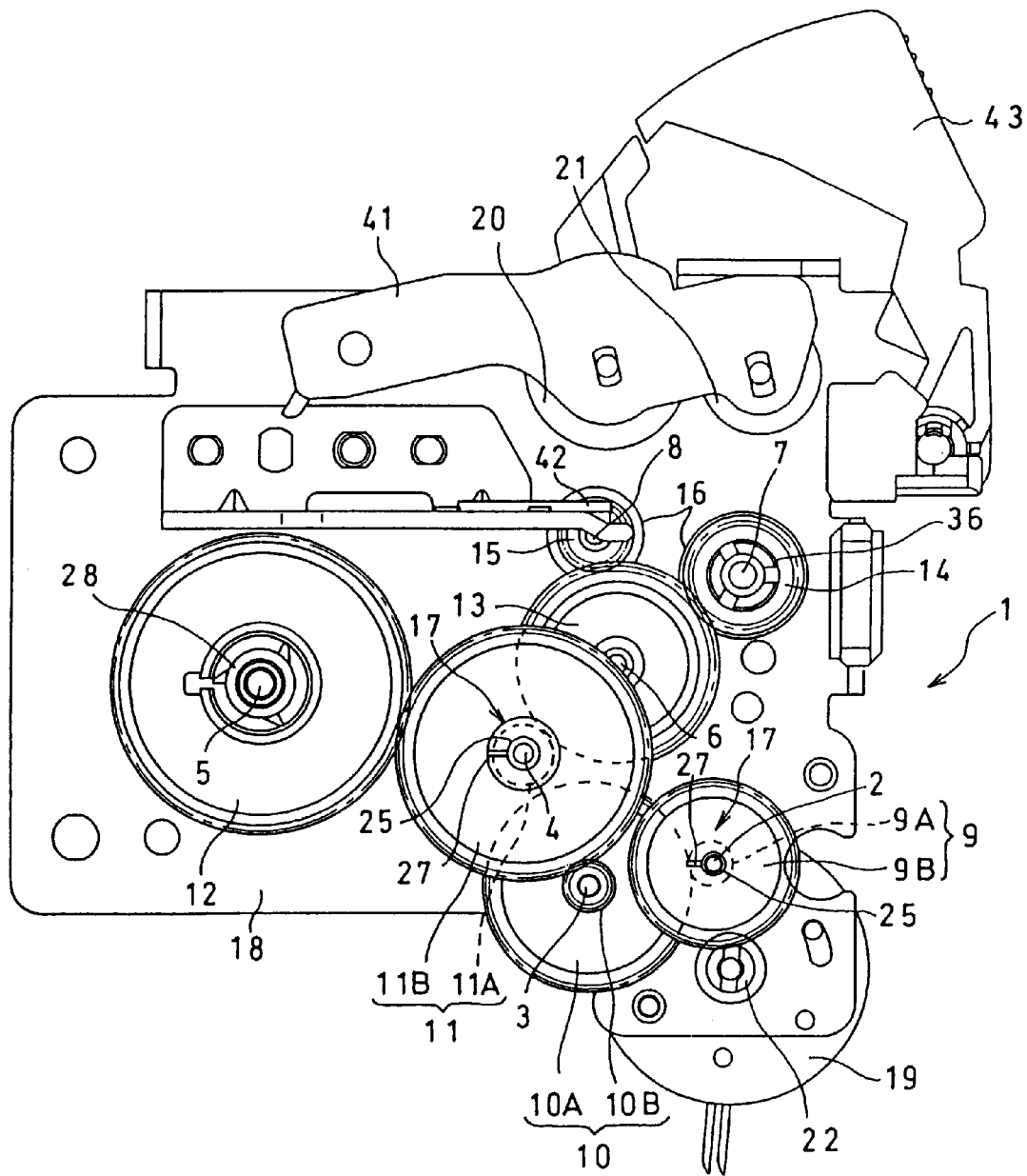
FIG. 1 is a top view showing a structure of a gear drive mechanism of an exemplary embodiment of the invention.
Figure 2:
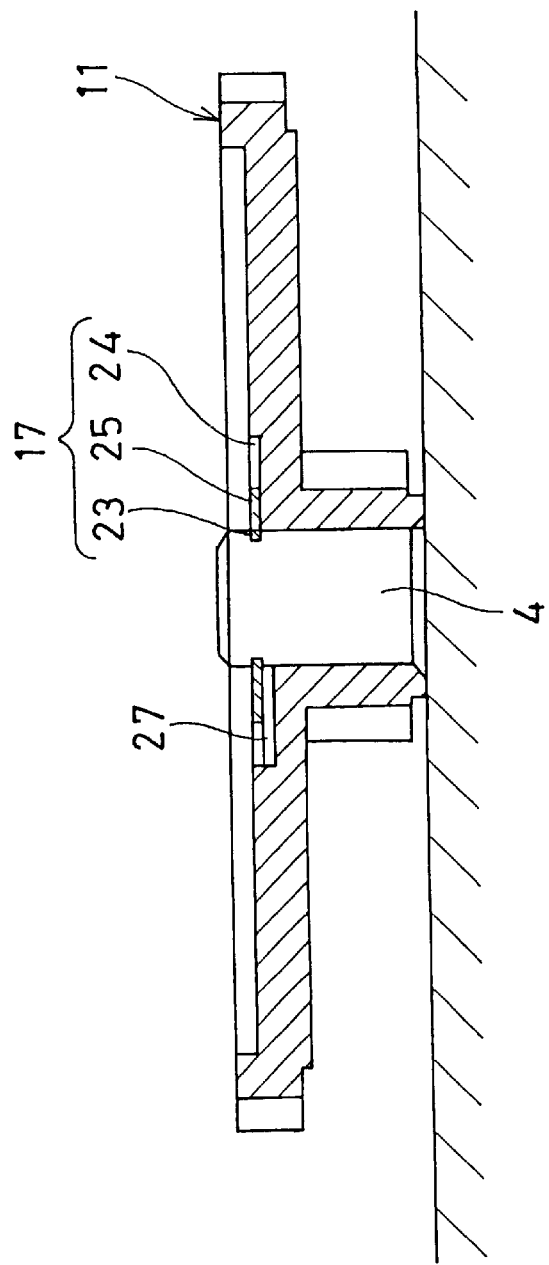
FIG. 2 is an enlarged sectional view showing a structure of a gear removal preventive means of the gear drive mechanism of FIG. 1.
Figure 3:
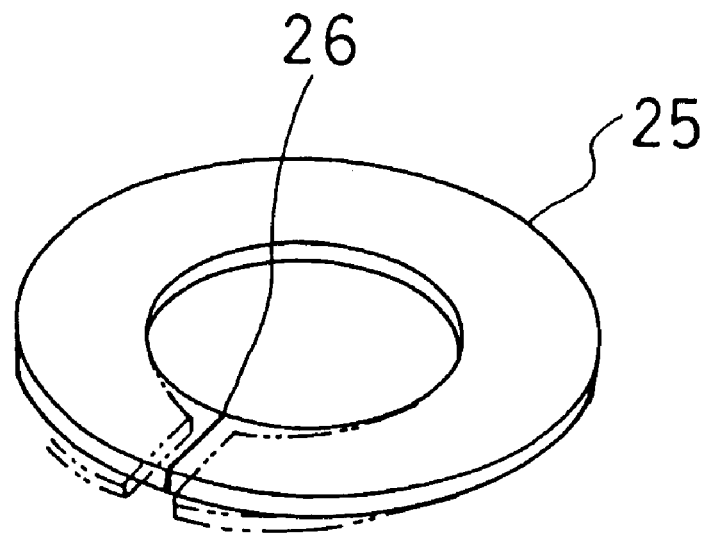
FIG. 3 is a perspective view of a washer of FIG. 2.

Hereinafter, an exemplary embodiment of the invention will be described with reference to the drawings. FIG. 1 is a diagram showing a structure of a gear drive mechanism 1 installed in an office product. FIG. 2 is an enlarged sectional view showing a structure of a gear removal preventive 17 of the gear drive mechanism 1. FIG. 3 is a perspective view of a washer 25 used in the gear removal preventive 17. As should be appreciated, the gear drive mechanism 1 can also be used for any structure attached to a motor. Thus, the invention is not limited to office products.

Figure 4:
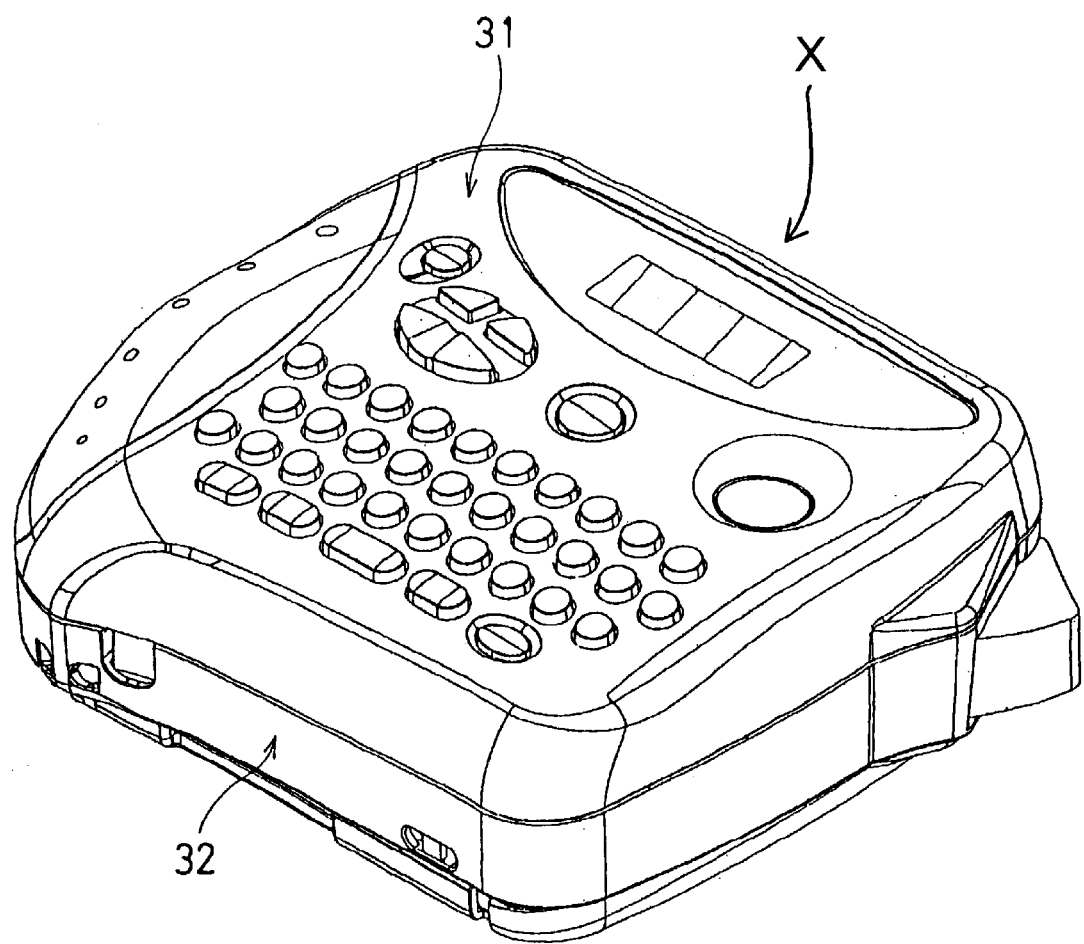
FIG. 4 is a perspective view showing a label writer to which the gear drive mechanism of the exemplary embodiment of the invention is applied.

The gear drive mechanism 1, shown in FIG. 1 for example, is applied to a label writer X, shown in FIG. 4, as its drive mechanism. The label writer X feeds a label tape from a label cassette and prints characters and the like on the label tape.

In FIG. 1, the gear drive mechanism 1 includes a plurality of shafts, a first shaft 2 to a seventh shaft 8; a plurality of gears, a first gear 9 to a seventh gear 15, which are fit into the respective shafts; and a gear removal preventive 17 for the first gear 9 of the first shaft 2 and the third gear 11 of the third shaft 4. These members 2 to 15 and 17 are provided on a base plate 18. On the base plate 18, there is a stepping motor 19 driving the gear drive mechanism 1, a swing lever 41 having a platen roller 20 for printing characters and the like on the label tape and a feed roller 21, a print head 42, and a lever 43 moving a cutter for cutting the label tape.

The first shaft 2 to seventh shaft 8 upwardly protrude from the base plate 18 in parallel. Of the shafts 2 to 8, the fourth shaft 5 is a take-up shaft of the label cassette and a drive shaft. The sixth shaft 7 is a drive shaft for driving a tape feed roller cam 36 provided to the label cassette.

The first gear 9 to seventh gear 15, shown in the drawing, are fit into the first shaft 2 to the seventh shaft 8, respectively. In the first shaft 2, the first gear 9, including a small-diameter gear 9A and a large-diameter gear 9B integrated in this order from the base plate 18 side, is fit and the removal preventive 17, described later, is provided to the first shaft 2 at its end. The large-diameter gear 9B of the first gear 9 engages an output gear 22 of the DC motor 19.

In the second shaft 3, the second gear 10, including a large-diameter gear 10A and a small-diameter gear 10B integrated in this order from the base plate 18 side, is fit. The large-diameter gear 10A of the second gear 10 engages the small-diameter gear 9A of the first gear 9. The large-diameter gear 10A of the second gear 10 is prevented from coming off because the large-diameter gear 10A is sandwiched between the large-diameter gear 9B of the first gear 9 and the base plate 18.

In the third shaft 4, the third gear 11, including a small-diameter gear 11A and a large-diameter gear 11B integrated in this order from the base plate 18 side, is fit and the removal preventive 17 is provided to the third shaft 3 at its end. The large-diameter gear 11B of the third gear 11 engages the small-diameter gear 10B of the second gear 10.

In the fourth shaft 5, the fourth gear 12 and a take-up shaft 28 are fit in this order from the base plate 18 side. The fourth gear 12 engages the large-diameter gear 11B of the third gear 11. The fourth shaft 5 and the take-up shaft 28 protrude away from the base plate 18 and engage the cassette. A E-shaped removal preventive clip, such as described above with the Background, is fit to the end of the fourth shaft 5. Therefore, the fourth gear 12 and the take-up shaft 28 is prevented from coming off from the fourth shaft 5.

In the fifth shaft 6, the fifth gear 13 is fit in line with the base plate 18. The fifth gear 13 engages the small-diameter gear 11A of the third gear 11. The fifth gear 13 is prevented from coming off because the fifth gear 13 is sandwiched between the large-diameter gear 11B of the third gear 11 and the base plate 18.

In the sixth shaft 7, the sixth gear 14 is fit in line with the base plate 18. In the seventh shaft 8, the seventh gear 15 is fit in line with the base plate 18. The sixth gear 14 and the seventh gear 15 engage the fifth gear 13. The sixth gear 14 and the seventh gear 15 each have collar 16, 16. The sixth gear 14 and the seventh gear 15 are prevented from coming off because the collars 16, 16 of the sixth gear 14 and the seventh gear 15 are sandwiched between the lower surface of the fifth gear 13 and the base plate 18.

The gear drive mechanism 1 transmits rotation of the DC motor 19 to the fourth gear 12 via the first to third gears 9, 10, 11, while reducing its speed, and rotates and drives the tape feed roller cam 36 and the seventh gear 15 via the third to fifth gears 11 to 13 while rotating and driving the take-up shaft 28. The seventh gear 15 rotates and drives the platen roller 20 via a gear not shown which is provided under the platen roller 20 on the same shaft as the platen roller 20 so that the gear can rotate together with the platen roller 20.

The gear removal preventive 17 is applied to the first shaft 2 and the third shaft 4 and are countershafts to prevent the gear from coming out at the end. As shown in FIG. 2, the gear removal preventive 17 for the third shaft 4 includes a removal preventive groove 23, an insertion groove 24, and a washer 25. The removal preventive groove 23 is a circular groove formed around the end of the third shaft 4. The insertion groove 24 is formed in a side surface of the large-diameter gear 11B of the third gear 11. The insertion groove 24 is formed around the third shaft 4, extending in a direction of the diameter.

As shown in FIG. 3, the washer 25 is formed in a ring shape and has a slit 26 extending in the direction of the diameter. The washer 25 is made of resin, such as plastic material, so that the thickness of the washer 25 can be 0.25 mm or less. The width of the removal preventive groove 23 and the insertion groove 24 of FIG. 2 is also formed to be the same dimension as the thickness of the washer 25. The washer 25 is fit in the removal preventive groove 23 using the slit 26 which is elastically deformed as shown by double dashed chain line. At the same time, the washer 25 is installed in the insertion groove 24 by releasing the elastic deformation.

The gear removal preventive 17 for the first shaft 2 has the same structure as that of the gear removal preventive 17 for the third shaft 4, except that the gear removal preventive 17 for the first shaft 2 does not have the insertion groove 24.

Therefore, the first gear 9 and the third gear 11 are prevented from coming off from the first shaft 2 and the third shaft 4, respectively. Because the third gear 11 is prevented from coming off, the second gear 10 and the fifth gear 13 provided under the third gear 11 are also prevented from coming off the shafts.

The washer 25 is detachable from the third gear 11 using a recessed portion 27. The recessed portion 27 is formed within the insertion groove 24 provided in the side surface of the third gear 11 and outwardly extends in the direction of the diameter of the third gear 11 from the third shaft 4. In other words, the recessed portion 27 and the insertion groove 24 are provided in a part of a side surface of the third gear 11 that outwardly extends in a direction of a diameter of the third gear 11, beyond an outer surface of the washer 25 such that the outer surface of the washer 25 in the direction of the diameter of the third gear 11 is not in contact with the third gear 11, and inwardly extends into the third gear 11 in an axial direction of the third gear 11. By rotating the washer 25 around the third shaft 4, the slot 26 is positioned over/near the recessed portion 27. In this state, a slim tool is inserted into the recessed portion 27 and the washer 25 is lifted from the third gear 11. By doing so, the washer 25 is vertically stretched at the slit 26 as a boundary. In this state, the washer 25 can be removed from the removal preventive groove 23 by moving the tool along the shaft. The washer 25 for the first gear 9 can also be removed from the first shaft 2 in the same manner.

As described above, according to the gear drive mechanism 1 of the exemplary embodiment of the invention, the gears 9 to 15 can be prevented from coming off by using the thin washer 25. When the washer 25 is made of plastic material, the washer can be thin, that is, the thickness of the washer can be 0.25 mm or less. Therefore, the removal prevention groove 23 of the third shaft 4 and the first shaft 2 can also be narrow in conformance with the thickness of the washer 25. The amount of protrusion of the third shaft 4 and the first shaft 2 from the third gear 11 and the first gear 9 can be restricted to a minimum. Accordingly, the thickness of the gear drive mechanism 1 can be reduced.

By inserting the slim tool into the recessed portion 27, the washer 25 can be easily removed from the third gear 11 and the first gear 9 and the first through seventh gears 9 to 15 can be disassembled.

Figure 5:
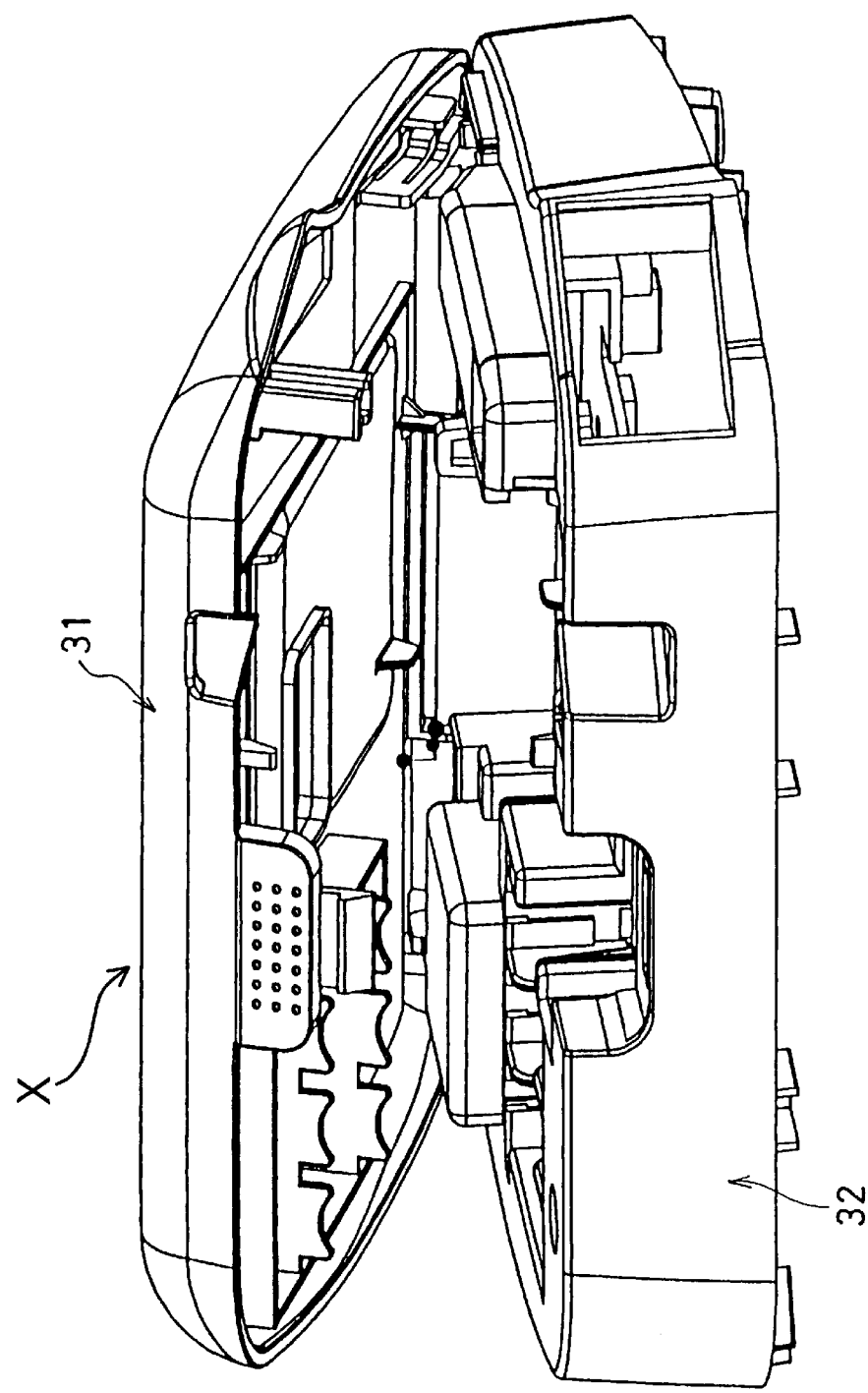
FIG. 5 is a perspective view showing a state where a lid of the label writer of FIG. 4 is open with respect to a main body.

As shown in FIGS. 4 and 5, the gear drive mechanism 1 is applied to the label writer X, which is an office product, as a drive mechanism. The label writer X includes a lid 31 and a main body 32. The lid 31 is provided to the main body 32 by hinges and freely covers and uncovers the main body 32. The lid 31 is provided with a keyboard for inputting data of characters. In the main body 32, a control circuit board that processes the data, the gear drive mechanism 1, the DC motor 19, the platen roller 20 and the print head 42 are provided.

Figure 6:
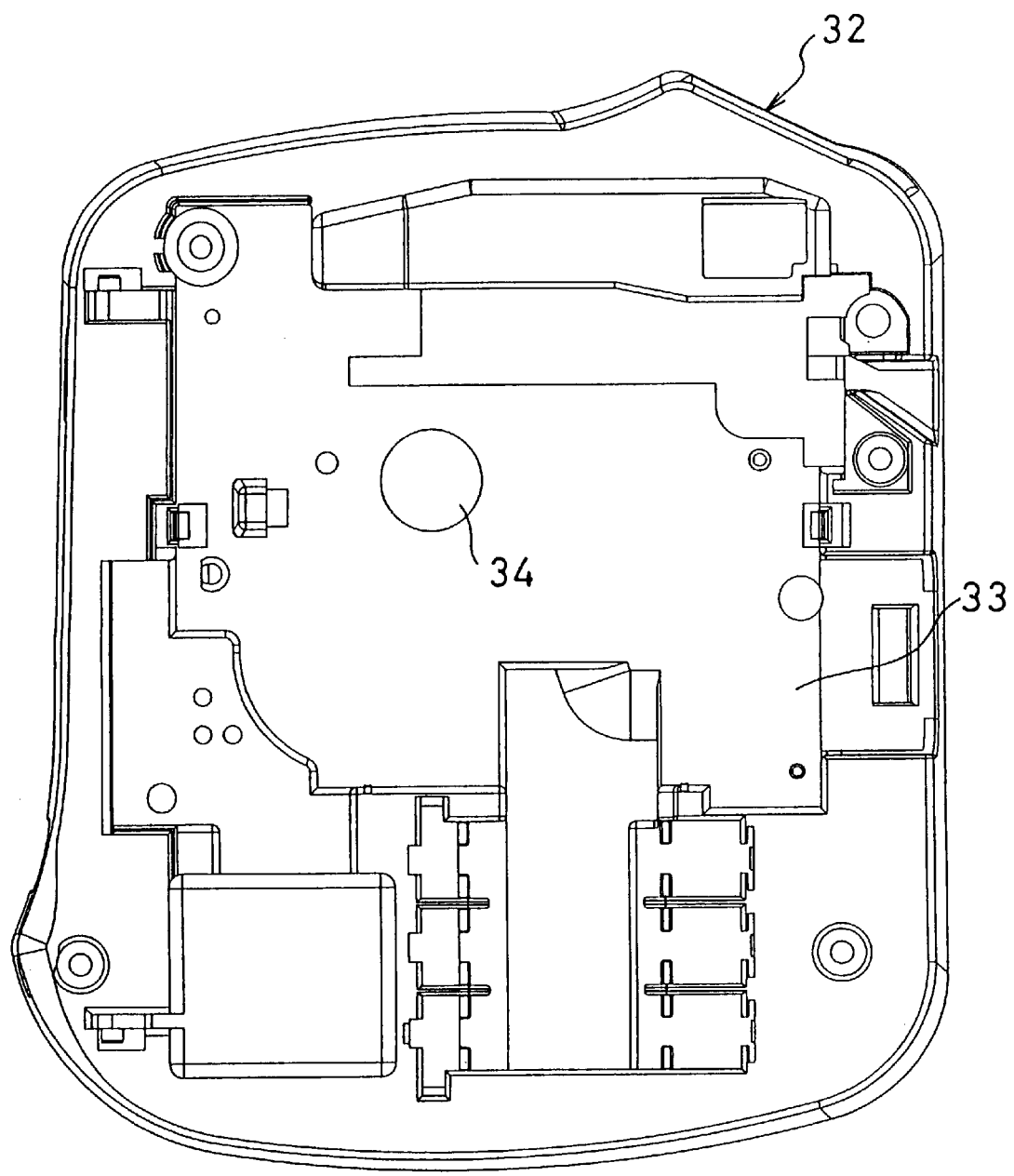
FIG. 6 is a diagram showing an inside of the label writer of FIG. 4.
Figure 7:
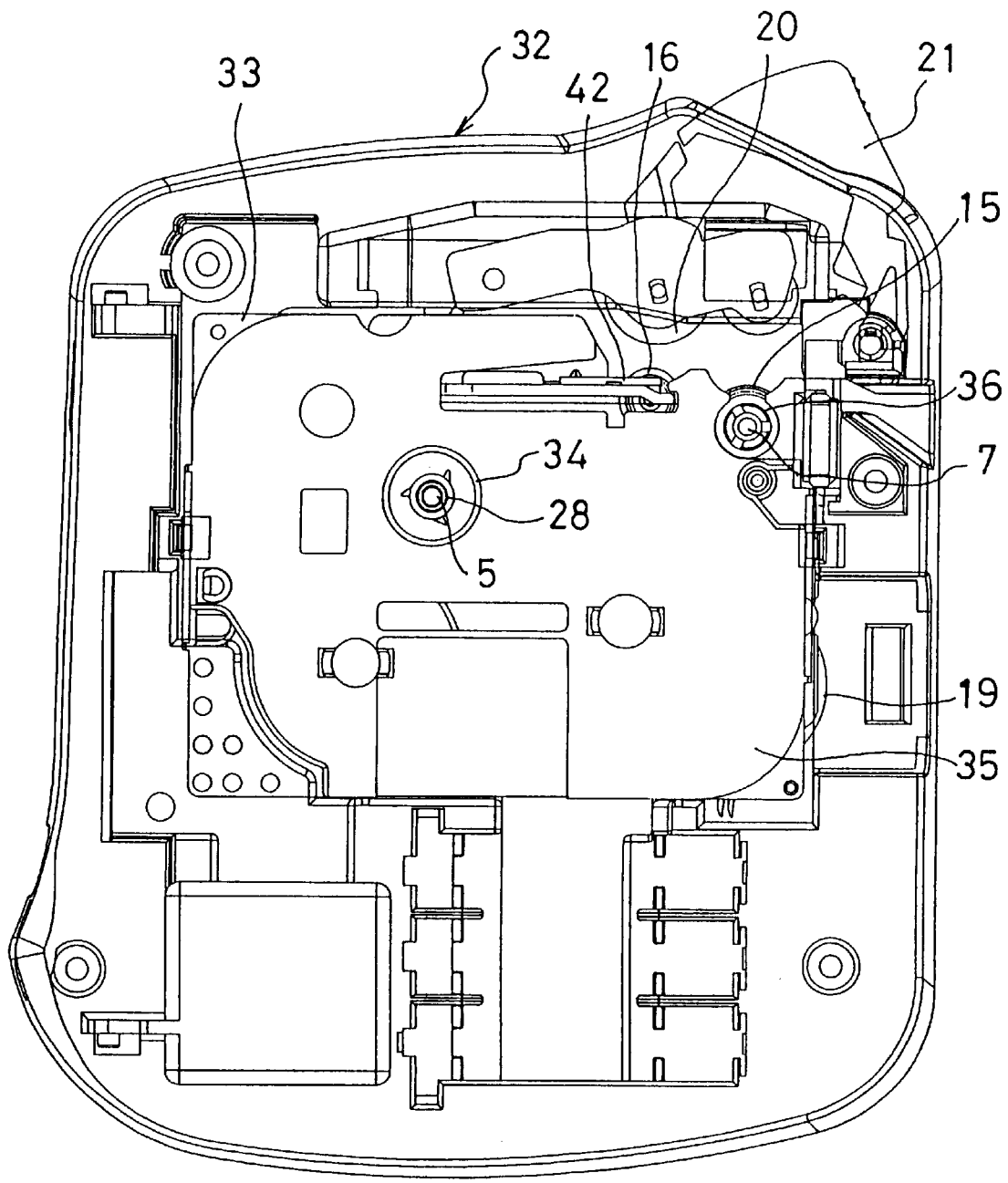
FIG. 7 is a diagram showing a state where a label cassette is installed inside of the main body of the label writer of FIG. 6.

As shown in FIGS. 6 and 7, the gear drive mechanism 1 is attached to the bottom of the main body 32 so as to be under a cover 33 provided in the main body 32. In the cover 33, an opening 34 is formed so that the take-up shaft 28 of the fourth shaft 5 passes therethrough. The label cassette 35 is installed on the upper side of the cover 33. The label cassette 35 is engaged with the take-up shaft 28 protruding from the cover 33 and then installed in the main body 32. The label tape is housed in the label cassette 35 in a wound state.

The label writer X feeds the label tape to the print head 42 from the label cassette 35 and prints input characters and the like onto the label tape using the print head 42 and the platen roller 20 by driving the gear drive mechanism 1 by the DC motor 19. Then, the label writer X discharges the printed label tape outside of the main body 32, by the tape feed roller cam 36 provided to the end of the sixth shaft 7 and the feed roller 21, and cuts the label tape by pressing the lever 43 for moving the cutter.

As described above, when the gear drive mechanism 1 of the exemplary embodiment of the invention is applied to the label writer X, the gear drive mechanism 1 can become thin so that the label writer X can be also thin. Therefore, a downsizing of the label writer X can be achieved.

The ends of the shafts, except for the fourth shaft 5 which is the take-up shaft, are covered with the cover 33. Therefore, the ends of the shafts are hidden, so that the inside of the main body 32 of the label writer X is visually simplified. Further, the gear drive mechanism 1 is thin, so that the space for the cassette installation is provided over the gear drive mechanism 1 and the cover 33.

The gear drive mechanism 1 of the exemplary embodiment of the invention has been described using an example that the gear drive mechanism 1 is applied to the label writer X. However, the invention is not restricted to the exemplary embodiment described above. The gear drive mechanism 1 can be also applied to other office products, such as printers and facsimile machines. In particular, when the gear drive mechanism 1 is applied to the small office products, the internal space in the main body can be effectively used.

Further, in the gear drive mechanism 1 of the exemplary embodiment described above, the gear removal preventive 17 including the washer 25 is applied to the first shaft 2 and the third shaft 4. Because the largest gear is fit onto the third shaft 4, the gear removal preventive 17 using the washer 25 is applied to only the third shaft 4. As a result, the thickness of the gear fit to the first shaft 2 becomes thin, so that the gear removal preventive 17 using the specified E-shaped removal preventive washer can be used. Further, the number of shafts and gears structuring the gear drive mechanism 1 and an arrangement are not restricted to the structure of FIG. 1.

Further, the use of plastic material is the best way to thin the washer 25. However, other materials can be used to thin the washer 25.

What is claimed is:

1. A gear drive mechanism with a drive shaft and a plurality of shafts cantilevered from a base plate, wherein gears are fit to the shafts and engaged with each other, the gear drive mechanism comprises:

a groove formed around an end of at least one of the shafts other than the drive shaft;

a washer, having a ring-shape and a slit in a direction of a diameter of the washer, fit in the groove as a removable preventive for a gear; and a recessed portion provided in a part of a side surface of the gear that outwardly extends in a direction of a diameter of the gear, beyond an outer surface of the washer such that the outer surface of the washer in the direction of the diameter of the gear is not in contact with the near, and inwardly extends into the gear in an axial direction of the gear.

2. The gear drive mechanism of claim 1, wherein the washer is made of plastic.

3. The gear drive mechanism of claim 1, wherein the washer is 0.25 mm or less in thickness.

4. The gear drive mechanism of claim 1, further comprising:

a cover, having an opening through which the drive shaft passes, adjacent to the base plate.

5. The gear drive mechanism of claim 1, wherein the recessed portion is formed within an insertion groove formed in a side surface of the gear.

6. The gear drive mechanism of claim 1, wherein the width of the groove and the washer is approximately the same.

7. The gear drive mechanism of claim 1, wherein the slit and the recessed portion are aligned when removing the washer.

8. The gear drive mechanism of claim 1, wherein the slit of the washer is aligned with the recessed portion prior to inserting the object.

9. A method of assembling a gear drive mechanism, comprising the steps of:

forming a groove around an end of at least one of a plurality of shafts other than a drive shaft;

placing a washer, having a ring-shape and a slit in a direction of a diameter of the washer, in the groove as a removable preventive for a gear; and providing a recessed portion in a part of a side surface of the gear that outwardly extends in a direction of a diameter of the gear, beyond an outer surface of the washer such that the outer surface of the washer in the direction of the diameter of the gear is not in contact with the gear, and inwardly extends into the gear in an axial direction of the gear.

10. The method of claim 9, wherein the washer is made of plastic.

11. The method of claim 9, wherein the washer is 0.25 mm or less in thickness.

12. The method of claim 9, further comprising the step of:

forming a cover, having an opening through which the drive shaft passes, adjacent to the base plate.

13. The method of claim 9, wherein the recessed portion is formed within an insertion groove formed in a side surface of the gear.

14. The method of claim 9, wherein the width of the groove and the washer is approximately the same.

15. The method of claim 9, wherein the slit and the recessed portion are aligned when removing the washer.

16. The method of claim 9, wherein the slit of the washer is aligned with the recessed portion prior to inserting the object.

* * * * *